United States Patent [19]
Gotou et al.

[11] Patent Number: 4,876,646
[45] Date of Patent: Oct. 24, 1989

[54] DATA PROCESSOR HAVING MULTILEVEL ADDRESS TRANSLATION TABLES

[75] Inventors: Shizuo Gotou; Toyohiko Kagimasa, both of Hachioji; Seiichi Yoshizumi, Hino, all of Japan

[73] Assignee: Hitachi, Ltd., Tokyo, Japan

[21] Appl. No.: 810,189

[22] Filed: Dec. 18, 1985

[30] Foreign Application Priority Data

Dec. 24, 1984 [JP] Japan ...................................... 270878

[51] Int. Cl.⁴ ............................. G06F 9/20; G06F 9/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,037,211 | 7/1977 | Ikuta et al. | 364/200 |
| 4,037,215 | 7/1977 | Birney et al. | 364/200 |
| 4,084,227 | 4/1978 | Bennett et al. | 364/200 |
| 4,128,875 | 12/1978 | Thurber et al. | 364/200 |
| 4,168,541 | 9/1979 | DeKarske | 364/200 |
| 4,244,033 | 1/1981 | Hattori | 364/900 |
| 4,279,014 | 7/1981 | Cassonnet et al. | 364/200 |
| 4,296,468 | 10/1981 | Bandoh et al. | 364/200 |
| 4,432,053 | 2/1984 | Gaither et al. | 364/200 |
| 4,531,200 | 7/1985 | Whitley | 364/900 |
| 4,569,018 | 2/1986 | Hummel et al. | 364/200 |
| 4,654,777 | 3/1987 | Nakamura | 364/200 |
| 4,680,700 | 7/1987 | Hester et al. | 364/200 |
| 4,691,277 | 9/1987 | Kronstadt et al. | 364/200 |
| 4,691,281 | 9/1987 | Furui | 364/200 |
| 4,695,950 | 9/1987 | Brandt et al. | 364/200 |

*Primary Examiner*—Thomas M. Heckler
*Assistant Examiner*—Viet Q. Nguyen
*Attorney, Agent, or Firm*—Antonelli, Terry & Wands

[57] ABSTRACT

An information processing system including a group of translation tables in a multilevel structure for achieving address translation from a virtual address into a real address, a control register for keeping a starting point address data of a translation table located at a highest level among the address translation tables and a level data indicating a level (n) of the translation table at the highest level among the group of translation tables, and a unit for sequentially accessing the address translation tables at levels lower than the level (n) indicated by the level data in the control register based on the starting point address data and a virtual address to be translated, thereby translating the virtual address into a real address.

3 Claims, 3 Drawing Sheets

DATA PROCESSOR HAVING MULTILEVEL ADDRESS TRANSLATION TABLES

BACKGROUND OF THE INVENTION

The present invention relates to an information processing system having multilevel address translation tables configured in a hierarchic structure.

In the past, translation tables having a hierarchic structure were used to achieve address translation in many information processing systems. The hierarchic structure is adopted because it makes it possible to flexibly construct address translation tables. That is, if the hierarchic structure is not used, the translation tables must be placed in continuous areas; moreover, the tables covering the entire access range must be provided for each program. However, if the translation tables are configured in the hierarchic structure, it is sufficient to provide for each program translation tables associated with the address range to be accessed by the program. In addition, even when the access range dynamically changes, the necessary data can be easily added to the translation tables. Conventionally, the translation tables have been constructed in a two-level configuration. When the address space is desired to be expanded in this case, multilevel translation tables become necessary accordingly. For example, if the upper-limit value of the address is increased from $2^{31}-1$ to $2^{63}-1$, translation tables which are structured in about five-level configuration are necessary.

Since such an expansion of the upper-limit value of the virtual address greatly affects the hardware and software of the information processing system, the expansion is not gradually executed in a step-by-step fashion; namely, the upper-limit value is changed to a considerably great value in ordinary cases. However, the address space which is actually required increases only gradually. Especially, conventional programs can operate sufficiently within the conventional address space. For the processing speed, consequently, it is not desirable that the address translation is carried out using all translation tables for such programs which do not have a large address space.

SUMMARY OF THE INVENTION

It is therefore an object of the present invention to provide a data processing system performing address translation by use of multilevel translation tables for enabling a high-speed address translation for a program which does not require all of the address space available in the system.

In accordance with the present invention, there is provided an information processing system comprising a group of translation tables in a multilevel structure for effecting address translation from a virtual address into a real address, a control register for keeping starting point address data of a translation table located at the highest level among the address translation tables and level data indicating a level (n) of the translation table at the highest level among the group of translation tables, and apparatus for sequentially accessing the address translation tables at levels lower than the level (n) indicated by the level data in the control register based on the starting point address data and a virtual address to be translated, thereby translating the virtual address into a real address.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
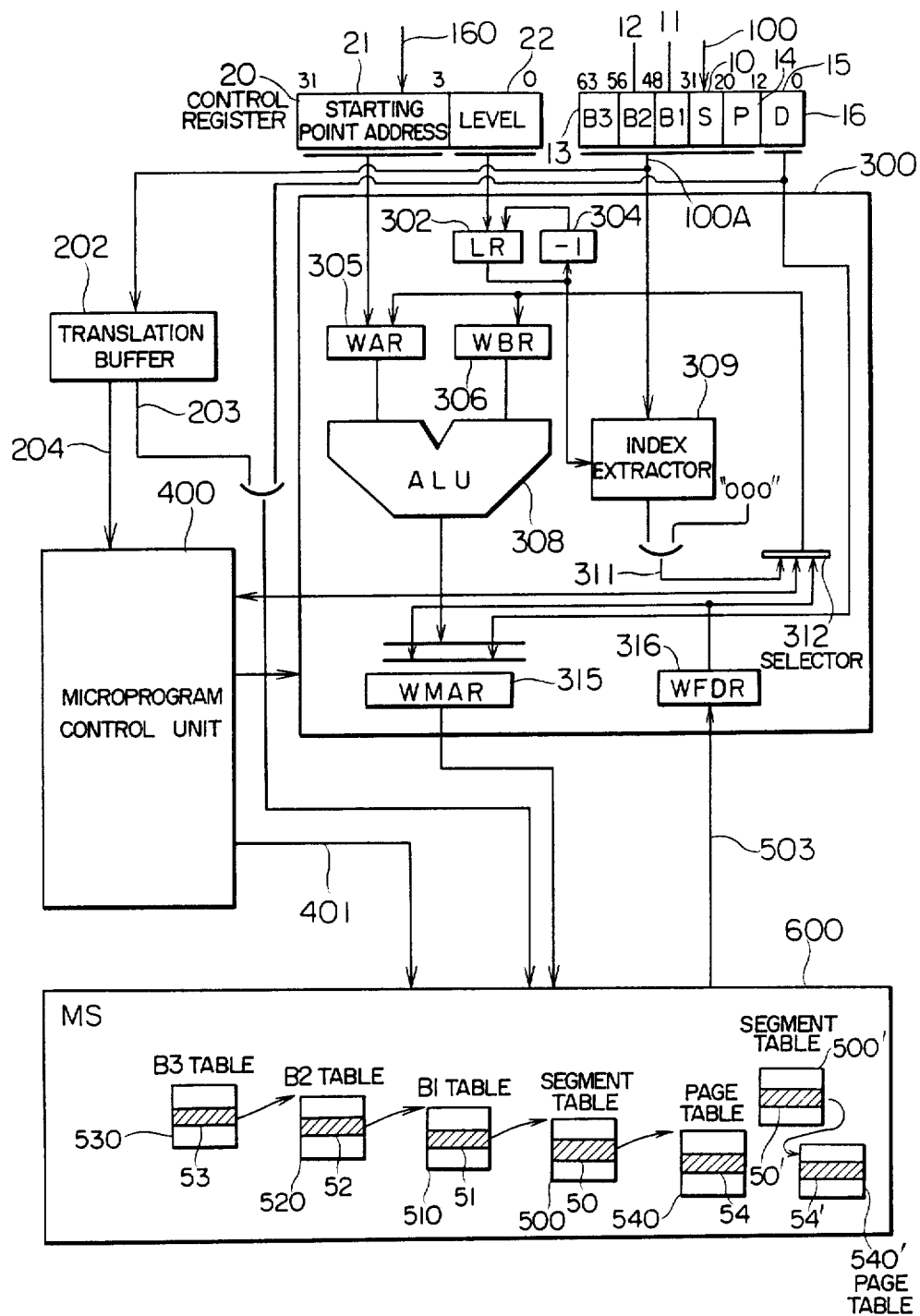
FIG. 1 is a schematic block diagam illustrating an information processing system according to the present invention.

In FIG. 1, a virtual address 100 generated by an instruction control unit (not shown) is set to a register 16. The virtual address 100 comprises six fields 10-15. The high-order address data 100A, including an index field (P) 14 and the higher-address fields thereof, is fed to an address translation buffer unit 202 so as to be translated into a real address. If a pair of the high-order virtual address section 100A and a real address corresponding thereto is found as an entry in the address translation buffer unit 202, the translation into the real address is assumed to be successful, and hence the real address and a byte index field 15 of the virtual address are combined with each other. The resultant data is transferred to a main storage (MS) 600 for an access of data stored therein. However, if such an entry corresponding to the high-order virtual address field 100A is missing in the address translation buffer unit 202, a signal 204 is transmitted to a microprogram control unit 400, which is thus actuated to access a group of address translation tables 500-540 or tables 500' and 540' in the main storage 600 for the address translation.

The virtual address register 16 has a length of 64 bits in which bits $2^{30}-2^{20}$, $2^{19}-2^{12}$, and $2^{11}-2^{0}$ are assigned as a segment table index (S) 14, a page table index (P) 15, and a byte index (D) 16, respectively. These indexes are identical to those included in a 31-bit virtual address of the conventional programs.

This embodiment also allows use of a 64-bit virtual address in which bits 63-56, 55-48, 47-31 represent a base 3 index (B3), base 2 index (B2), and base 1 index (B1), respectively.

Consequently, if the 31-bit virtual address of the conventional program is used in this embodiment, 0's are set into the B1, B2, and B3 index fields 11-13 in advance.

A group of address translation tables for various programs to be executed in this system are beforehand stored in the main storage 600.

In FIG. 1, the B3 table 530 B2 table 520, B1 table 510, segment table 500, and page table 540 respectively instantiate a group of tables for a new program using the extended 64-bit virtual address. Each index, for example, the B3 index in the virtual address register 16 indicates an entry to be accessed in the corresponding table, namely, the B3 table. The segment and page tables 500' and 540' are shown as an example of a group of translation tables to be used to translate a 31-bit virtual address of the conventional programs. Although tables equivalent to the B1, B2, and B3 tables 510-530 may be provided in the main storage 600 for the address translation of the conventional programs so as to be accessed by the operating system program when necessary, the B1, B2, B3 tables 510-530 are not used to translate addresses of the conventional programs according to the address translation of the present invention. In the following description, the embodiment will be explained on the assumption that the B1, B2, and B3 tables 510-530 are not stored in the main storage 600.

A control register 20 contains starting point address data 21 of a translation table at the highest level among the translation tables necessary for an execution of the current program and a level data 22 indicating the level. The level data is set to 3, 2, 1, or 0 when the highest-level translation table is the B3, B2, B1, or segment table, respectively. At program initiation, the operating system sets the data items 21-22 via a line 160 to the control register 20.

Figure 2:
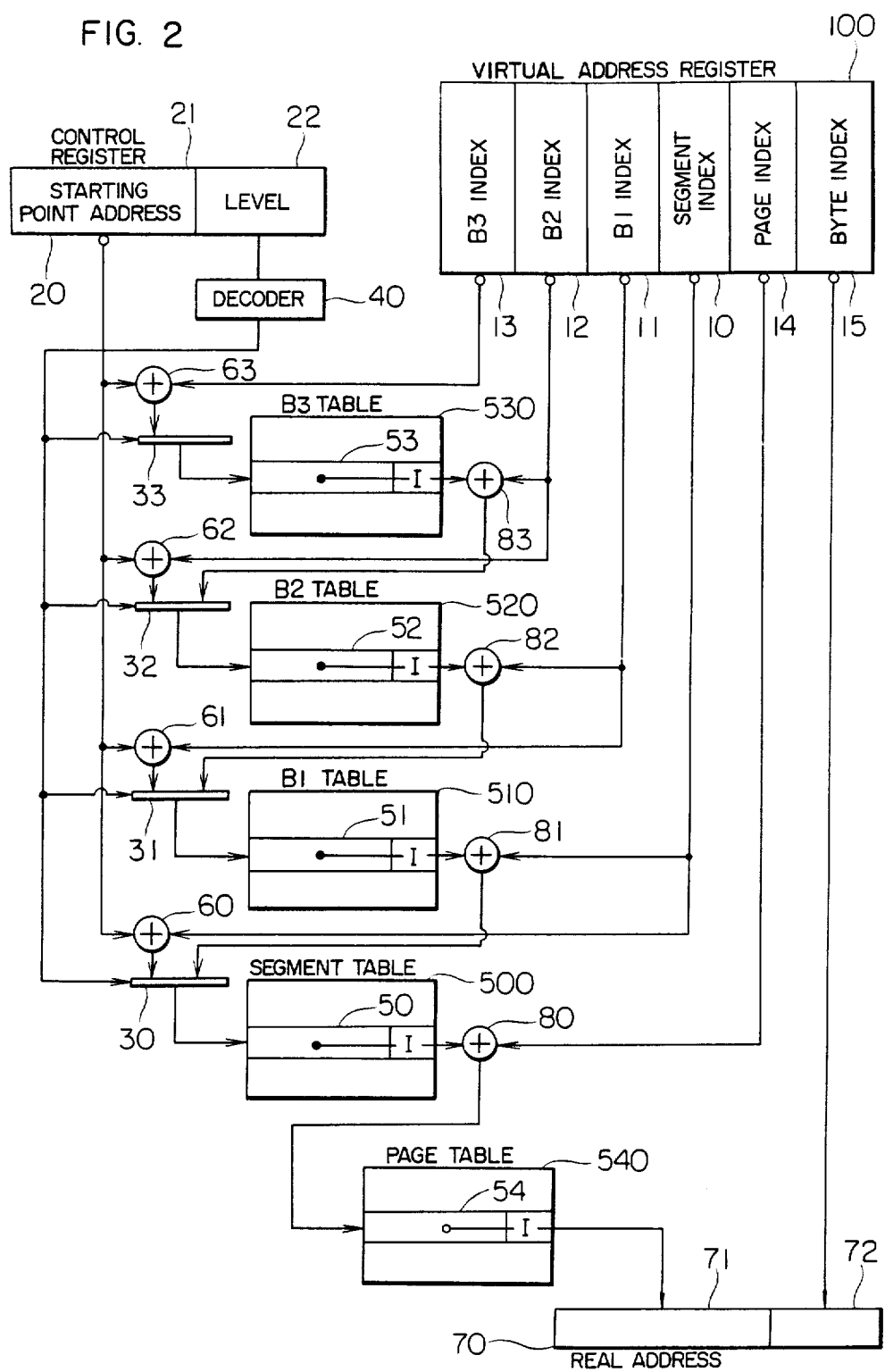
FIG. 2 is a conceptual diagram illustrating address translation according to the present invention.

In FIG. 2 showing a conceptual data flow diagram in the address translation processing of the present invention, the content (assumed to be n=0-3) of the level data 22 in the control register 20 is decoded by a decoder 40, and the resultant data is used to control selectors 30-33. The starting point address data 21 is fed from the control register 20 to an arithmetic unit 6n (n=0, 1, 2 or 3) corresponding to the level n among arithmetic units 60-63. In addition, the content 1n (n=0, 1, 2 or 3) of the Bn index (n=0, 1, 2 or 3) corresponding to the level n is supplied from the virtual address register 16 to the arithmetic unit 6n, which in turn executes an arithmetic operation as follows.

(Starting point address data 21)+(1n(n=0, 1, 2 or 3) of Bn index (n=0, 1, 2 or 3))×(Entry length of table at level n).

The decoder 40 selects an output from the arithmetic unit 6n (n=0, 1, 2 or 3) corresponding only to the selector 3n (n=0, 1, 2 or 3) among the selectors 30-33.

The selected operation result is used as a memory fetch address to fetch an entry 5n (n=0, 1, 2 or 3) from the table 5n0 (n=0, 1, 2 or 3) at the level n. The fetched data 5n and the content of the index 1 $\overline{n-1}$ of the next B $\overline{n-1}$ index are inputted to an adder 8n, thereby calculating an address to fetch an entry 5 $\overline{n-1}$ from a table 5 $\overline{n-1}$ 0 at the level n−1 as follows.

(Content of entry 5 $\overline{n-1}$)+(Content of index 1 $\overline{n-1}$ of B $\overline{n-1}$ index)+(Entry length of table 5 $\overline{n-1}$ 0 at level n−1). The resultant data is fed to the selector 3 $\overline{n-1}$ to fetch an entry 5 $\overline{n-1}$ from a table 5 $\overline{n-1}$ 0.

Similarly, the entries of the segment table 500 and the page table 540 are sequentially fetched by use of the segment index 10 and the page index 14, respectively so that the entry 54 of the table 540 constitutes a high-order field 71 of a real address 70. A low-order field 72 of the real address 70 is constructed by the content of the byte index 15 in the virtual address register 16. The address translation from a virtual address into a real address is achieved as described above.

The outline of the address translation has been described.

Figure 3:
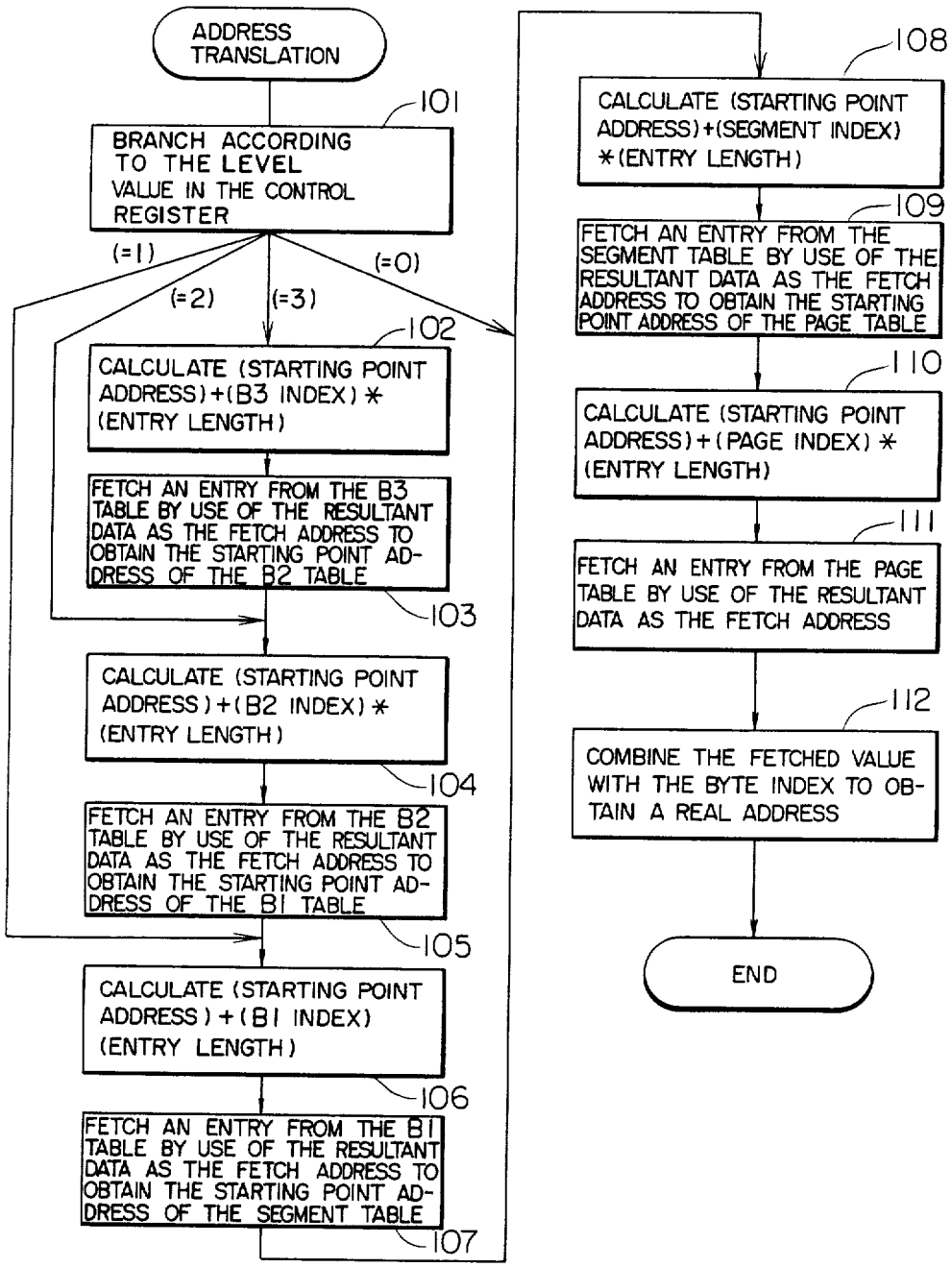
FIG. 3 is a flowchart of address translation in the information processing system of FIG. 1.

Next, a concrete processing flow of the address translation in the system of FIG. 1 will be described with reference to FIG. 3. The processing illustrated in FIG. 3 is executed under control of the microprogram control unit 400.

(1) In step 101, control branches according to the value of the level data 22 stored in the control register 20. In detail, the starting point address data 21 and the level data 22 are moved from the control register 20 to a first input register 305 and a level register 302, respectively. Furthermore, the content of the level register 302 is set to a work register (WBR) 306. An arithmetic and logic unit (ALU) checks the data and sends the result to the microprogram control unit 400, thereby passing control to step 108, 106, 104, or 102 when the level data is 0, 1, 2, or 3, respectively. The level data 22 of the control register 20 is used at the branch destination.

(2) The following calculating is executed in step 102. (Starting point address data 21 of B3 table 530 in the control register 20)+(Value of B3 index 13 in the virtual address register 16)×(Entry length 18 of B3 table 530). That is, the high-order bit section 100A of the virtual address in the virtual address register 16 is delivered to an index extractor 309, which then extracts the content of an index corresponding to the high-order bit section 100A of the virtual address (B3 index 13 in step 102) according to the value of the level register (LR) 302. In this embodiment, the entry length is assumed to be eight bytes for all address translation tables. (Consequently, three 0 bits are located at the end of the index thus extracted to calculate the product of the extracted index and the entry length (8 bytes) of each table. The extracted index is therefore multiplied by eight. The resultant data 311 is set via a selector 312 to a second input register (WBR) 306 of an ALU 308. The starting point address data 21 set to the first input register WAR 305 and the content of the second address register WBR 306 are added by the ALU 308.

In step 103, an entry 53 is fetched from the B3 table 530 by use of the result of addition as the fetch address. The fetched data points to the starting point address of the B2 table 520.

The microprogram control unit 400 sets an output from the ALU 305 to an address register 315 to send the output to the main storage 600 and issues a fetch request to the main storage 600. In response to the fetch request, data 503 is fetched from the main storage 600 and is transferred to a fetch data register 316 in an arithmetic logic section 300. The data 503 is further sent via the selector 312 to the first input register WAR of the ALU 308. This data indicates the starting point address of the B2 table. During the operations described above, the content of the level register 302 is decremented by one by use of a subtractor 304.

(3) In step 101 or 103 before starting step 104, the first input register WAR 305 is loaded with the starting point address data 21 of the control register 20 or data obtained as the address data 21 in step 103, respectively.

A level data item (value=2) is set to the level register 302 in advance. Like step 102, step 104 achieves the following calculation by use of the contents of registers 305 and 302.

(Starting point address of B2 table 520)+(value of B2 index in the virtual address register 16)×(Entry length (8) of B2 table).

In step 105, an entry 52 is fetched from the B2 table 520 by use of the result of calculation as the fetch address in the same way as for the step 103. The fetched data points to the starting point address of the B1 table 510.

(4) In step 101 or 105 before starting step 106, the first input register 305 is loaded with the starting point address data of the control register 20 or the data obtained as the address data in step 105; furthermore, 1 is set to the level register 302 in advance. Like step 102, step 106 carries out the following calculation.

(Starting point address of B1 table)+(Value of B1 index 11 in the virtual address register 16)×(Entry length (8) of B1 table 510).

In step 107, an entry 51 is fetched from the B1 table 510 by use of the resultant data as the fetch address in the same way as for step 103. The fetched data points the starting point address of the segment table 500.

(5) Prior to initiation of step 108, the starting point address data of the segment table (for example, 500 or 500') is set to the first input register 305, while the register 302 is loaded with $\phi$. Like step 102, step 108 executes the following arithmetic operation.

(Starting point address of segment table 500 or 500')+(Value of segment index 10 in the virtual address register 16)×(Entry length (8) of segment table 500 or 500').

In step 109, an entry 50 or 50' is fetched from the segment table 500 or 500' by use of the resultant value as the fetch address. The fetched value points to the starting point address of the page table 540 or 540'.

(6) In step 110, the following computation is performed in the same way as for step 102.

(Starting point address of page table 540 or 540')+(Value of page index 14 in the virtual address register 16)×(Entry length of page table 540 or 540').

In step 111, an entry 54 or 54' is fetched from the page table 540 or 540' by use of the resultant value as the fetch address, and the fetched data is set into the register 316.

(7) In step 112, the fetched data is set to the high-order section of the address register 315. The low-order section of the address register 315 is loaded with the content of the byte index 16 in the virtual address register 10.

As described above, a real address corresponding to the virtual address in the virtual address register 10 is set into the address register 315 so as to be used to access the main storage 600.

As can be seen from the foregoing description, when the virtual address 150 set into the register 16 comprises 64 bits, the address translation is achieved by accessing five tables 500–540. If the virtual address 150 set into the register 16 is substantially represented by 31 bits, the address translation is carried out only by accessing the segment table 500' and the page table 540'. According to the present invention, therefore, only the necessary address translation tables are accessed for the address translation depending on the size of the address space actually required for each program. This eliminates unnecessary access to the main storage and makes it possible to construct an information processing system suitable for executing programs requiring various sizes of address spaces.

Although the embodiment has been described in association with a case having an address translation buffer, the present invention is also applicable to a case not having an address translation buffer. In such a case, the instruction control unit (not shown) needs only to directly initiate the microprogram control unit 400.

We claim:

1. An information processing system, comprising:
a group of address translation tables in a multi-level configuration of greater than two levels for translating virtual addresses into corresponding real addresses, each one of said address translation tables not in the lowest level of said multi-level configuration containing a plurality of entries each of which points to a starting address of another address translation table, the former table being in a higher level than the latter table in said multi-level configuration and one of said address translation tables in the lowest level of said multi-level configuration having real address data signals to be provided as a result of address translation of a virtual address into a real address by said group of address translation tables;

a virtual address register for holding virtual address data to be transformed into real address data, said virtual address register comprising a plurality of data fields, each data field corresponding to one of said levels, and said virtual address data occupying a respective number of data fields among said plurality of data fields depending upon the data length of said virtual address data;

a control register for holding starting address data and level data, said level data indicating the level of the highest level address translation table required to translate the virtual address data held by said virtual address register into corresponding real address data, and said starting address data indicating a starting address of the highest level address translation table as indicated by said level data; and means connected to said virtual address register and said control register for sequentially accessing plural address translation tables starting from the address translation table indicated by said level data in said control register, and going down to address translation tables at the levels lower than the level indicated by said level data, said accessing being effected on the basis of the starting address indicated by said starting address data and data in said data fields of said virtual address register.

2. An information processing system according to claim 1, wherein said accessing and generating means includes:
means connected to said control register for generating level data for a next lower level of said multi-level configuration, whenever access to one of said plural address translation tables is made; and
means for generating address data indicative of an address of one of the entries held by an address translation table to be accessed next based upon one of the starting address data and data fetched from a precedingly accessed address translation table and based upon data in a data field of said virtual address register corresponding to the level indicated by level data generated by said means for generating level data.

3. An information processing system according to claim 1, wherein the lowest level address translation table is a page table and the address translation table at the next to the lowest level is a segment table.

* * * * *